United States Patent
Rivet et al.

(10) Patent No.: US 8,593,116 B2
(45) Date of Patent: Nov. 26, 2013

(54) SWITCHED-MODE POWER SUPPLY INCLUDING SWITCH PROTECTION CIRCUIT

(75) Inventors: Bertrand Rivet, Vouvray (FR); Benoît Peron, Tours (FR); Aurélien Hamadou, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 570 days.

(21) Appl. No.: 12/727,125

(22) Filed: Mar. 18, 2010

(65) Prior Publication Data
US 2010/0237843 A1  Sep. 23, 2010

(51) Int. Cl.
*H02M 3/158*  (2006.01)
(52) U.S. Cl.
USPC ........................... 323/225; 323/262; 323/259
(58) Field of Classification Search
USPC ............ 363/89; 323/220, 222, 223, 225, 232, 323/229, 259, 262, 271, 282, 344–346
See application file for complete search history.

(56) References Cited

U.S. PATENT DOCUMENTS

| | | | | |
|---|---|---|---|---|
| 5,260,607 A * | 11/1993 | Kinbara | ...................... | 327/427 |
| 5,543,704 A * | 8/1996 | Thoren | ...................... | 323/222 |
| 5,909,107 A * | 6/1999 | Aonuma et al. | .............. | 323/222 |
| 6,987,379 B2 | 1/2006 | Peron | | |
| 7,023,186 B2 * | 4/2006 | Yan | .............................. | 323/225 |
| 7,915,876 B2 * | 3/2011 | Orr | .............................. | 323/259 |
| 2002/0113581 A1* | 8/2002 | Eagar et al. | .................. | 323/282 |
| 2004/0113596 A1* | 6/2004 | Peron | ........................ | 323/282 |
| 2005/0226012 A1* | 10/2005 | Jovanovic et al. | ............. | 363/59 |
| 2008/0186748 A1* | 8/2008 | Cuellar et al. | ............... | 363/123 |

FOREIGN PATENT DOCUMENTS

JP       9233808 A    9/1997

OTHER PUBLICATIONS

French Search Report from corresponding French Application No. 09/51725.

* cited by examiner

*Primary Examiner* — Adolf Berhane
*Assistant Examiner* — Gustavo Rosario Benitez
(74) *Attorney, Agent, or Firm* — Wolf, Greenfield & Sacks, P.C.

(57) ABSTRACT

A switched-mode converter includes a first magnetic circuit including a first inductive element, coupled to at least one second inductive element and electrically coupled in series with the second element and with a first diode between a first one of two input terminals and a first one of two output terminals; a first switch coupled in series with a third inductive element between a second terminal of the first inductive element and a second input terminal, a common node between the first switch and the third inductive element being connected to one of the output terminals by a second diode; and a circuit capable of canceling the voltage across the first switch before its turning-on.

12 Claims, 2 Drawing Sheets

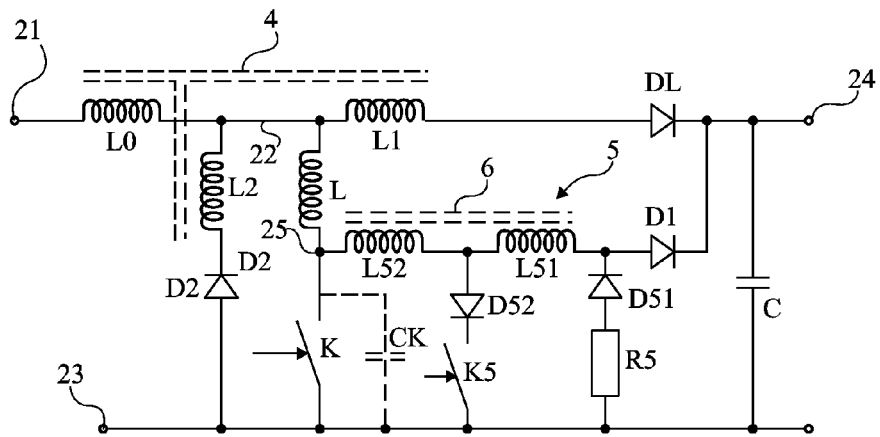
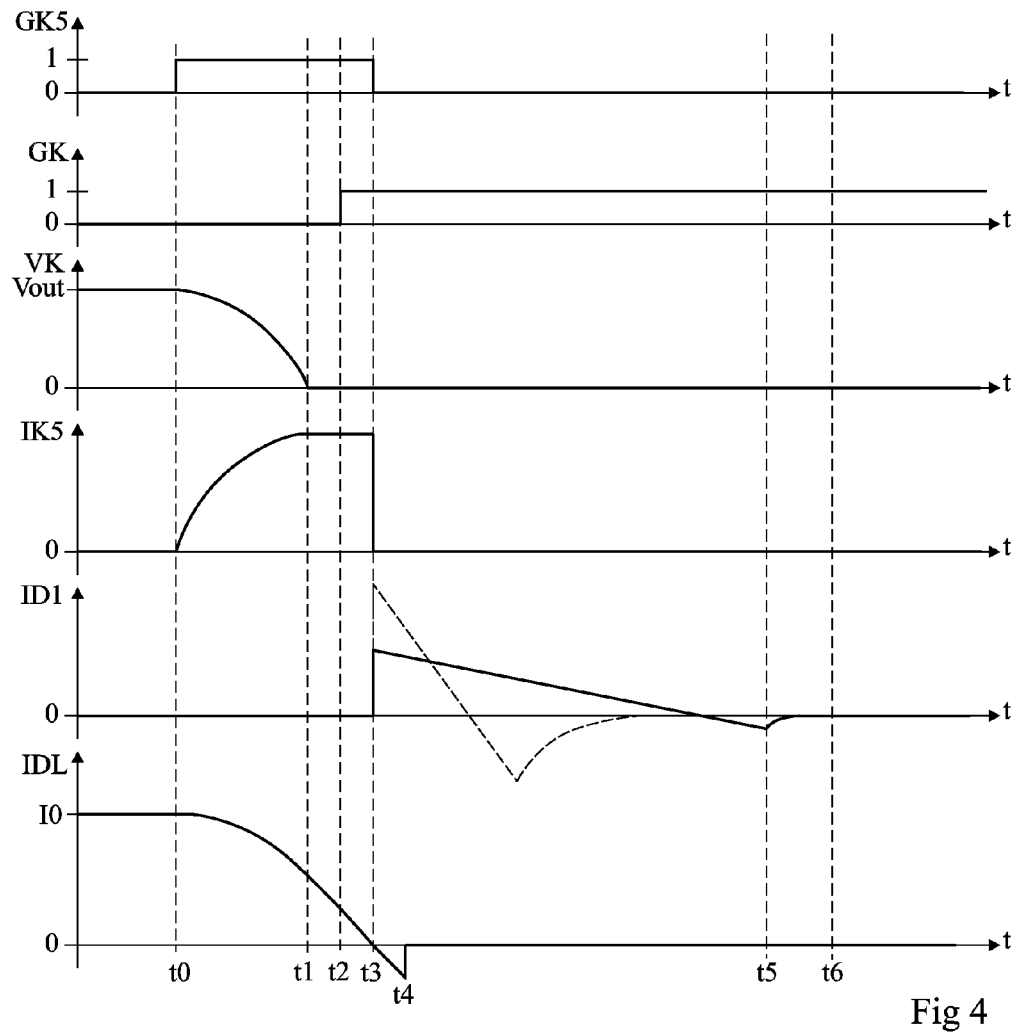

SWITCHED-MODE POWER SUPPLY INCLUDING SWITCH PROTECTION CIRCUIT

CROSS REFERENCE TO RELATED APPLICATIONS

This application claims the priority benefit of French patent application 09/51725, filed on Mar. 18, 2009, entitled "SWITCHED-MODE POWER SUPPLY," which is hereby incorporated by reference to the maximum extent allowable by law.

BACKGROUND OF THE INVENTION

1. Field of the Invention

The present invention generally relates to electronic circuits and more specifically to so-called switched-mode power converters, also called switched-mode power supplies.

2. Discussion of the Related Art

A switched-mode converter uses inductive elements, associated with a power switch and with a free wheel diode, to perform a power conversion, generally from a generally D.C. input voltage, or from an A.C. voltage when the power factor is desired to be corrected. This input voltage is most often obtained by rectification of an A.C. voltage, typically the mains voltage of the electric distribution network. The converter provides a D.C. voltage regulated with respect to a set-point value. Voltage step-down (buck), step-up (boost) and mixed (buck-boost) converters are known.

Converters generally comprise a switching-aid circuit and a control circuit of the power switch. The control circuit control the duty cycle of the chopping of the input voltage so that the output voltage corresponds to the desired reference value. The switching-aid circuit especially aims at decreasing power losses.

FIG. 1 shows a simplified diagram of an known example of a boost converter associated with its switching-aid circuit. Such a converter with a switching-aid circuit is described in U.S. Pat. No. 6,987,379.

This boost converter comprises a switch K controlled by a circuit 1' (CTRL), for example, a pulse-width modulation control circuit (PWM) based on a desired reference voltage REF and on a measured value FB of the D.C. output voltage Vout provided to a load 2 (Q). A power storage inductance L0 is connected, by a first terminal 21, to a first terminal of application of a rectified A.C. input voltage. Terminal 21 generally corresponds to the positive rectified output voltage of a rectifying bridge 3 having its A.C. input terminals connected to terminals 31 and 32 of application of an A.C. supply voltage Vac (for example, the mains voltage). A second terminal 22 of inductance L0 is connected to a terminal 23 of application of a reference voltage, by a di/dt control inductance L in series with switch K. The reference voltage is common to the D.C. input and to the output of the converter. This voltage generally corresponds to the ground, connected to the reference rectified output terminal of bridge 3.

Inductance L0 belongs to a magnetic circuit 4 and forms its main winding. Circuit 4 comprises two secondary windings L1 and L2 having numbers of spirals, respectively N1 and N2 smaller than number N0 of spirals of inductance L0. A first winding L1 of magnetic circuit 4 is connected between inductance L0 and a free wheel diode DL having its cathode connected to a positive output voltage 24 of the converter. Inductance L1 may also be placed between the cathode of diode DL and terminal 24. A second winding L2 connects node 22 to reference terminal 23 by being in series with a diode D2, the anode of diode D2 being on the side of ground 23. The respective positions of diode D2 and of inductance L2 may also be inverted. Finally, a diode D1 connects node 25 of interconnection between di/dt control inductance L and switch K to terminal 24, the anode of diode D1 being on the side of node 25. Terminal 24 is connected to reference terminal 23 by a storage capacitor C across which is present regulated output voltage Vout. Capacitor C may belong to the load to be supplied by the power converter. In the example of FIG. 1, assuming that the phase point of winding L0 is connected to terminal 21, the phase point of winding L1 is on the side of terminal 22 and the phase point of winding L2 on the side of ground 23. If however, the phase point of winding L0 is on the side of terminal 22, the phase point of winding L1 needs to be on the side of terminal 24 and the phase point of winding L2 on the side of terminal 22.

When switch K is turned on, the power is stored in inductance L0 and load Q is supplied by the power stored in capacitor C. When switch K is off, inductance L0 gives back stored power to capacitor C via free wheel diode DL.

The function of inductance L is to limit, on the one hand, the dissipated losses resulting from the voltage decrease and with the current increase in switch K at its turning-on and on the other hand, the losses resulting from free wheel diode DL due to a recovered charge phenomenon.

The function of magnetic circuit 4 is to recover the recovery current of diode DL to transfer it into main inductance L0, so that it is then provided to the load. For this purpose, winding L1 imposes, at the turning off of switch K, a negative voltage across inductance L to enable it to transfer the power that it contains to capacitor C. Diode D1 is then forward biased. Winding L2 has the function, at the turning-on of switch K, to impose a negative voltage across inductance L, to transfer the power that it contains into winding L2 of the magnetic circuit. This power is then recovered by winding L0 which gives it back to capacitor C at the next turning-off of the switch.

Switch K is generally formed of a MOS transistor and exhibits a stray capacitance $C_K$ at its terminals (between its drain and source). This stray capacitance generates losses at each turning-off and turning-on of the switch. At the turning-on, the power stored in the stray capacitance is dissipated in the switch (in its on-state series resistance). At the turning-off, the stray capacitance stores power, causing new losses in the switch. Voltage peaks generate noise and wear out the switch.

It would be desirable to further improve the operation of a power converter to decrease its switching losses and protect the cut-off switch.

SUMMARY OF THE INVENTION

An object of the present invention is to provide a switched-mode converter which overcomes all or part of the disadvantages of usual converters.

An object of an embodiment is to add to the converter a circuit aiming at protecting its cut-off switch against an excessive wearing due to the power stored in its stray capacitance.

An object of an embodiment is to decrease the switching losses of the switch, especially at its turning-off.

To achieve all or part of these objects as well as others, at least one embodiment of the present invention provides a switched-mode converter comprising:

a first magnetic circuit comprising a first inductive element, coupled to at least one second inductive element and electrically in series with this second element and with a first diode between a first one of two input terminals and a first one of two output terminals;

a first switch in series with a third inductive element between a second terminal of the first inductive element and a second input terminal, a common node between the first switch and the third inductive element being connected to one of the output terminals by a second diode; and a circuit capable of canceling the voltage across this first switch before its turning-on.

According to an embodiment of the present invention, said circuit capable of canceling the voltage across the first switch comprises:

a fourth inductive element between said common node and the third diode; and between the fourth inductive element and the third diode, two branches of connection to the second input terminal, respectively by a resistive element and by a second switch.

According to an embodiment of the present invention, each branch further comprises a diode.

According to an embodiment of the present invention, the converter further comprises a second magnetic circuit comprising the fourth inductive element coupled to a fifth inductive element, said fifth inductive element being electrically in series with the fourth inductive element and interposed between said branches.

According to an embodiment of the present invention, the first magnetic circuit further comprises a sixth inductive element in series with a fifth diode and the second input terminal.

The present invention also provides a method for controlling such a converter in which the second switch is turned on before the turning-on of the first switch and is turned off after the turning-on of this first switch.

The foregoing objects, features, and advantages of the present invention will be discussed in detail in the following non-limiting description of specific embodiments in connection with the accompanying drawings.

BRIEF DESCRIPTION OF THE DRAWINGS

FIG. 3 is an electric diagram of a preferred embodiment of a boost converter; and FIG. 4 illustrates in timing diagrams the operation of the converter of FIG. 3.

DETAILED DESCRIPTION

Figure 1:
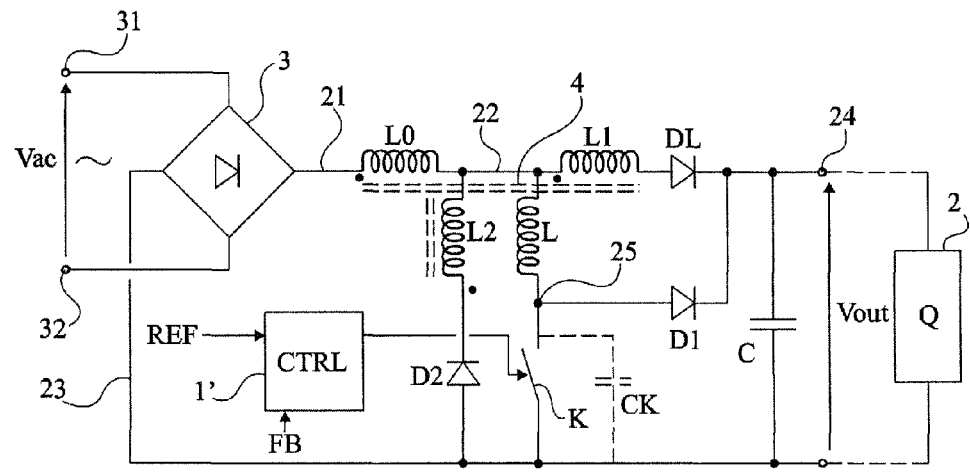
FIG. 1, previously described, is a simplified electric diagram of a known boost converter associated with a switching-aid circuit.

The same elements have been designated with the same reference numerals in the different drawings.

For clarity, only those elements which are useful to the understanding of the present invention have been shown and will be described. In particular, the upstream and downstream circuits of the switched-mode converter have not been described, the present invention being compatible with any upstream circuit for providing a D.C. voltage (filtered or not) and with any load usually connected downstream of the switched-mode converter. Further, the control by pulse width modulation and the regulation of the control signal of the cut-off switch have not been detailed, the present invention being here again compatible with usual circuits.

Figure 2:
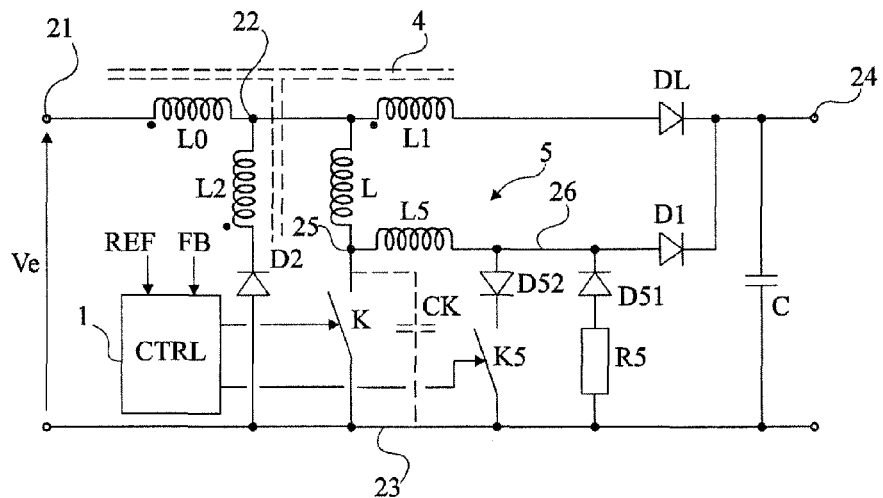
FIG. 2 is a simplified electric diagram of an embodiment of a boost converter associated with a switching-aid circuit, also for recovering power from the stray capacitance of the cut-off switch.

FIG. 2 shows an embodiment of a boost converter with a magnetic circuit.

As previously, a cut-off switch (typically, a field-effect transistor, for example a MOS power transistor) is connected by an inductance L for controlling its di/dt to a terminal 22 of an inductance L0 having its other terminal 21 intended to receive an input voltage, for example, a D.C. voltage Ve. In most applications, voltage Ve corresponds to a rectified A.C. voltage (filtered or not). Inductance L0 forms the primary winding of a magnetic circuit 4. Terminal 22 is connected to a positive output terminal 24 by a secondary inductance L1 of magnetic circuit 4, in series with a free wheel diode DL. A second secondary inductance L2 of the magnetic circuit, in series with a diode D2, connects node 22 to a terminal 23 of application of the reference voltage (typically the ground) of the input and output voltages. Terminals 24 and 23 are connected by a capacitor C, possibly in the load (not shown). Switch K is controlled by a circuit 1 (CTRL).

A circuit 5 for recovering the power of the stray capacitance of switch K at its turning-on (also called protection circuit) is interposed between the anode of a diode D1 having its cathode connected to terminal 24 and junction point 25 of inductance L and switch K. Circuit 5 comprises an inductive element L5 between node 25 and the anode of diode D1. Anode 26 of diode D1 is further connected to terminal 23, on the one hand by a resistor R5 in series with a diode D51 and on the other hand by an auxiliary switch K5 in series with a diode D52. The anode of diode D51 is on the side of ground 23. The anode of diode D52 is on the side of node 26. Switch K5 is controlled by circuit 1 and is turned on before switch K to discharge its stray capacitance. Thus, when switch K is turned on by circuit 1, the voltage thereacross is zero. The function of inductance L5 is to recover the stored power of the stray capacitance of the switch by resonance. Diode D52 prevents the current from flowing through the substrate diode of transistor K5 when said transistor is blocked. Finally, resistor R5 damps the overvoltages across diodes D1 and D52 at the blocking of diode D1.

The value of inductance L5 is selected to be smaller than the value of inductance L. Thus, the settling time of the current in switch K5 is, as a first approximation, equal to $$\frac{\pi}{2}\sqrt{L5 \cdot CK}.$$

This duration may thus be considered as essentially depending on the values of stray capacitance CK of main switch K and of inductance L5.

Zero voltage switching circuit 5 (ZVS) of FIG. 2 recovers the power of the stray capacitance of switch K, which is then injected back towards the load and protects switch K by ensuring a turning-on while the voltage thereacross is zero.

The use of such a circuit enables using higher switching frequencies than with the circuit of FIG. 1. This improves the efficiency of the converter.

It could have been devised to use a protection circuit 5 with no magnetic circuit 4. However, the provided combination has many advantages over a solution with no magnetic circuit. In particular, the conduction time of switch K5 is made almost independent from the supplied power and from the input voltage (it only depends on the values of L5 and of CK). This decreases the conduction losses in switch K5, which otherwise would need to be sized for the worst case. Further, a compromise between the values of stray capacitance CK of switch K and the series on-state resistance RdsON of switch K5 is avoided.

FIG. 3 shows another embodiment of a boost converter aiming at limiting the losses linked to the charges recovered when diode D1 is blocked.

With respect to the embodiment of FIG. 2, inductance L5 of the protection circuit is replaced with a magnetic circuit 6 comprising two coupled inductances L51 and L52 electrically in series (inductance L52 on the side of node 25), number N51 of spirals of inductance L51 of magnetic circuit 5 is generally smaller than number N52 of spirals of inductance L52. The value of inductance L51 is smaller than the value of inductance L to respect the time condition given in relation with FIG. 2. The sum of the values of inductances L51 and L52 may be greater than the value of inductance L. The phase points of the inductances are selected to both be on the same side (on the side of node 25 or on the side of diode D1).

FIG. 4 shows timing diagrams illustrating the operation of the converter of FIG. 3 around a turning-on of switch K. These timing diagrams respectively show an example of the shape of the periods in the on state of switches K and K5 (signals GK and GK5 arbitrarily at state 1 during these on periods), of current IK5 in switch K5, of current ID1 in diode D1, and of current IDL in free wheel diode DL. The switching cycle is not entirely shown in FIG. 4, only the behavior around the turning-on of switch K being illustrated. The used cut-off frequency is generally greater than some hundred kHz and is thus large as compared with the frequency (50 or 60 Hz) of the A.C. voltage generally used for the power supply.

It is assumed that at a time t0, circuit 1 causes the turning-on of switch K5. Before time t0, one is thus in free wheel diode phase, that is, a current I0 assumed to be constant at a positive level (in the arbitrary orientation taken in the drawings) flows through diode DL, coming out from inductances L0 and L1, and charges output capacitor C. The voltage across switches K and K5 approximately corresponds to level Vout (both transistors are off). The current in inductance L is zero and diodes D1 and D2 are blocked.

Time t0 starts a turn-on beginning phase. The current originating from the power supply and flowing in inductance L0 splits between inductance L1 in series with diode DL on the one hand, and inductance L in series with inductance L52 and switch K5 on the other hand. The turning-on of switch K5 also causes the discharge of the stray capacitance of switch K and cancels the voltage thereacross. The current in switch K5 increases until a time t1, with a slope which is essentially a function of the value of inductance L52 and of stray capacitance CK of switch K $$(t1 - t0 = \frac{\pi}{2} \sqrt{L52 \cdot CK}).$$

The voltage across switch K cancels at time t1. Current IDL in diode DL decreases with the same slope. Diodes D1 and D2 remain blocked, as well as diode D51. At time t1, the current coming out from inductance L0 is shared between free wheel diode DL and diode D52 with a ratio depending on the ratio between the number of spirals of inductances L1, L, and L52 and the value of stray capacitance CK of the switch.

At a time t2, subsequent to time t1, the control circuit causes the turning-on of switch K. The advantage of having a duration between times t0 and t1 that can be considered as independent from the supplied power and from the level of current I0, which varies at each switching period, thus better appears herein. This enables to more easily parameterize the control circuit so that it causes the turning-on of switch K as soon as possible and thus enables to increase the frequency of the switching cycles.

Switch K5 is turned off at a time t3, just after time t2. The interval between times t2 and t3 is selected to be as short as possible according to the operating tolerances of the control circuit to avoid a turning-off of switch K5 before the turning-on of switch K.

At time t3, current IK5 in switch K5 instantaneously disappears to be transferred from inductance L52 to inductance L51 due to coupled magnetic circuit 6, with an amplitude which depends on the ratio between the numbers of spirals N52 and N51. The current peak which appears in diode D1, then forward biased, thus reappears. Due to the turning-on under a zero voltage, the amplitude of the current peak in the diode no longer depends on the current in the inductance of circuit 5 at the turn-on time. Further, due to the presence of magnetic circuit 6, the peak amplitude is decreased by a factor N52/(N51+N52) with respect to the peak which appears in the circuit of FIG. 2 and which has an amplitude corresponding to the amplitude of the current in switch K5 at the time of its turning-off. Now, the lower the decrease speed and the current peak in D1, the lower the amount of charges recovered at the blocking of the diode, and thus the losses associated with the carrying off of these charges. This phenomenon is illustrated on the timing diagram of current ID1, where an example of behavior of the current with the circuit of FIG. 2 is shown in dotted lines to be compared with the behavior (in full line) with the circuit of FIG. 3. The decrease slope of current ID1 corresponds to the ratio between the output voltage (across capacitor C) and the sum of the values of inductances L51 and L52. For a given time interval between times t0 and t1, the current in diode D1 thus takes longer to disappear with the circuit of FIG. 3 than with the circuit of FIG. 2. This is however not disturbing since this corresponds to a power storage period in inductances L0 and L1.

At a time t5 where the current in diode D1 reaches its reverse maximum IRM (due to its recovery), charging inductances L51 and L52 in magnetic form at a value $$\frac{1}{2} \cdot (L51 + L52) \cdot IRM^2,$$

where L51 and L52 designate the respective values of inductances L51 and L52, diode D51 becomes forward-biased. This power is then dissipated in resistor R5 until a time t6. At time t5, the voltage across switch K5 (off since time t3) cancels. The turning-off of switch K may occur from time t6.

On the side of magnetic circuit 4, at a time t4 (between times t3 and t5) where diode D2 turns on, the (negative) current in diode DL abruptly stops, and the corresponding current is injected back into inductance L2. One can then observe a conduction of diode D2 which is used as a free wheel element to transfer the power from inductance L into magnetic circuit 4, then disconnected from load Q. The operation of magnetic circuit 4 is not modified with respect to the operation described in above-mentioned U.S. Pat. No. 6,987, 379.

Various embodiments with different variations have been described hereabove. It should be noted that those skilled in the art may combine various elements of this various embodiments and variations without showing any inventive step. In particular, although the present invention has been described in relation with an example of conversion of a positive voltage, it easily transposes to a converter of a negative voltage with respect to the ground.

Further, it also transposes to a buck converter. For this purpose, element L0 is connected to first terminal 24 and is in series, with inductance L1 and diode DL between this terminal and a first input terminal here corresponding to ground 23 (anode of diode DL on the ground side). Switch K in series with inductance L connects (second) terminal 22 of inductance L0 to a second input terminal (here, positive terminal 21). Diode D1 connects common node 25 to terminal 23, and inductance L2 in series with diode D2 connects terminal 22 to terminal 21. Inductances L51 and L52 in series with inductance D1 connect node 25 to ground 23 and branches D52, K5 and D51, R5 are connected to terminal 21.

Further, the selection of the values of the components and of the conduction conditions of the switches according to the load and to the input voltage is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switched-mode converter comprising: a first magnetic circuit comprising a first inductive element, directly coupled to at least one second inductive element and directly connected in series with the second inductive element and with a first diode between a first one of two input terminals and a first one of two output terminals;
   a first switch directly coupled in series with a third inductive element between a second terminal of the first inductive element and a second input terminal, a common node between the first switch and the third inductive element being connected to one of the output terminals by a second diode; and
   a circuit capable of canceling the voltage across the first switch before its turning-on, comprising:
   a fourth inductive element and a fifth inductive element directly connected in series between the common node and the second diode, the fourth and fifth
   inductive elements forming a second magnetic circuit; a first branch including a second switch and a third diode; and a second branch including a resistive element and a fourth diode, one of the first and second branches having a first terminal directly connected to a second node common to the fourth and fifth inductive elements and the other of the first and second branches having a first terminal directly connected to a third node common to the fifth inductive element and the second diode, wherein second terminals of the first and second branches are connected to the second input terminal.

2. The converter of claim 1, wherein the first magnetic circuit further comprises a sixth inductive element coupled in series with a fifth diode and the second input terminal.

3. The converter of claim 1, wherein the second switch is turned on before the turning-on of the first switch and is turned off after the turning-on of this first switch.

4. A switched-mode power converter comprising:
   a first inductive element, a second inductive element and a first diode directly connected in series between a first input terminal and a first output terminal;
   a first switch directly coupled in series with a third inductive element between the first inductive element and a second input terminal;
   a second diode directly coupled to the first output terminal; and a protection circuit directly coupled to a first node common to the third inductive element and the first switch, the protection circuit comprising:
   a fourth inductive element having a first terminal directly connected to the first node and a second terminal directly connected to a second node;
   a fifth inductive element having a first terminal directly connected to the second node and a second terminal directly connected to the second diode;
   a first branch including a second switch and a third diode, the first branch having a first terminal directly connected to the second node and a second terminal directly connected to the second input terminal; and
   a second branch including a resistive element and a fourth diode, the second branch having a first terminal directly connected to a third node common to the fifth inductive element and the second diode and a second terminal directly connected to the second input terminal.

5. A switched-mode power converter as defined in claim 4, wherein the first and second inductive elements form a first magnetic circuit.

6. A switched-mode power converter as defined in claim 5, further comprising the fifth inductive element coupled between the two branches, the fourth and fifth inductive elements forming a second magnetic circuit.

7. A switched-mode power converter as defined in claim 6, further comprising a sixth inductive element coupled in series with a fifth diode between the first inductive element and the second input terminal.

8. A switched-mode power converter as defined in claim 4, further comprising a controller configured to control the on and off states of the first and second switches.

9. A switched-mode power converter as defined in claim 8, wherein the controller is configured to turn the second switch on before the first switch is turned on and is configured to turn the second switch off after the first switch is turned on.

10. A switched-mode power converter as defined in claim 4, wherein a value of the fourth inductive element is less than a value of the third inductive element.

11. A switched-mode power converter as defined in claim 6, wherein a value of the fifth inductive element is less than a value of the third inductive element.

12. A switched-mode power converter as defined in claim 6, wherein the sum of values of the fourth inductive element and the fifth inductive element is greater than a value of the third inductive element.

* * * * *